Figure 1:
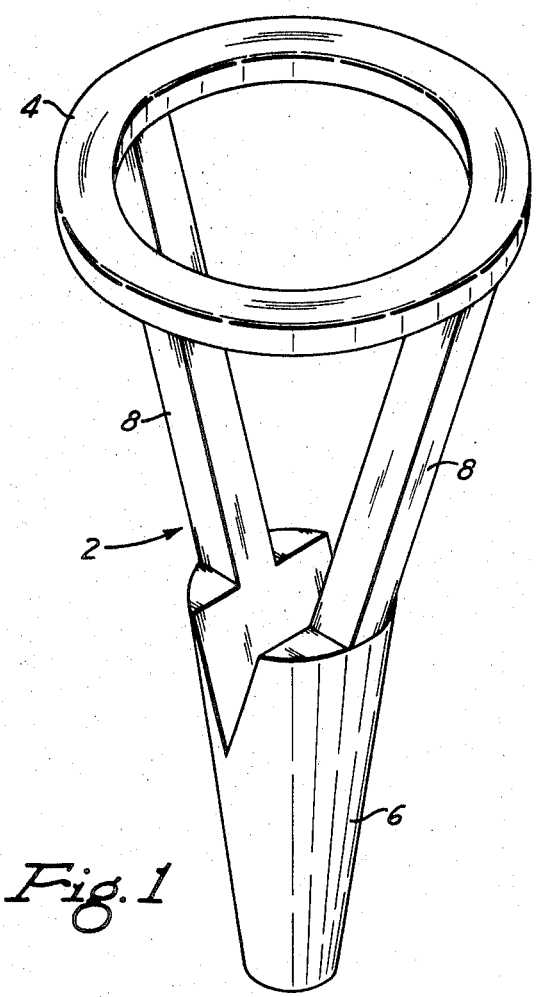

United States Patent [19]
Dimond

[11] 3,721,151

[45] March 20, 1973

[54] TEACHING AID
[76] Inventor: Harold L. Dimond, 10629 Grimsby Lane, Cincinnati, Ohio 45241
[22] Filed: July 19, 1971
[21] Appl. No.: 163,724

Related U.S. Application Data

[63] Continuation-in-part of Ser. No. 113,891, Feb. 9, 1971, abandoned.

[52] U.S. Cl. ................................. 84/398, 84/465
[51] Int. Cl. ............................................. G10d 9/02
[58] Field of Search ......... 84/398, 399, 400, 453, 465

[56] References Cited

UNITED STATES PATENTS

| | | | |
|---|---|---|---|
| 2,515,411 | 7/1950 | La Velle | 84/398 |
| 776,785 | 12/1904 | Kruse | 84/399 |
| 583,421 | 5/1897 | Skidmore | 84/398 |

*Primary Examiner*—Richard B. Wilkinson
*Assistant Examiner*—Lawrence R. Franklin

[57] ABSTRACT

A teaching aid for use in combination with brass instruments composed of a rim, a tapered shank and one or more arms, each of which is securely attached at one end to said rim and the other end thereof to the larger end of said tapered shank. In a preferred embodiment the tapered shank is provided with an opening extending longitudinally therethrough.

10 Claims, 3 Drawing Figures

PATENTED MAR 20 1973　　　　　　　　　　3,721,151

INVENTOR.
HAROLD L. DIMOND

TEACHING AID

This application is a continuation-in-part application of my application Ser. No. 113,891, for Teaching Aid filed Feb. 9, 1971 now abandoned.

This invention relates to a teaching aid for use with brass instruments. Although brass instruments are generally constructed in whole or in part of brass, they need not be to retain their membership in the family. Certain features are recognized by those skilled in the art which typify these instruments. One of these is that they are played by causing vibrations of lips inside a cup-shaped mouthpiece. Another is that vibrations in these instruments are given their characteristic tonal qualities by the special combination of construction features peculiar to the same, some of which may include material of construction, length, diameter, taper, weight, shape, thickness of tubing, etc. In the brass instruments the sound produced is amplified by the flare-shaped bell at the end thereof. Examples of various types of brass instruments include trumpet, cornet, baritone, emphonium, fleugel horn, bugle, bass trumpet, alto horn, French horn, tenor horn, mellophone, trombonium, trombone, tuba, sousaphone, etc.

It is of course understood that the goal of a musician is to produce beautiful sounds. The objective of a player of a brass instrument, then, involves a study to find the best way to do this, which means the proper placement and development of the embouchure, that is, the area of the mouth which is involved in the production of sound. The muscle structure of the lips, mouth, jaw, chin and cheeks are all integral parts of this area. There are several important reasons for proper embouchure development. For example, as a musician improves his embouchure, he can improve his intonation and tone quality, increase his range, speed his tonguing, lengthen his endurance and increase his dexterity. The device of this invention is an extremely valuable aid in teaching, learning, and diagnosing the difficulties of playing brass instruments because it permits development of a good embouchure and facilitates the choice of the most suitable instrument in the brass family.

Accordingly, the device described and defined herein is intended for instructing and assisting students in proper embouchure placement and development.

Figure 2:
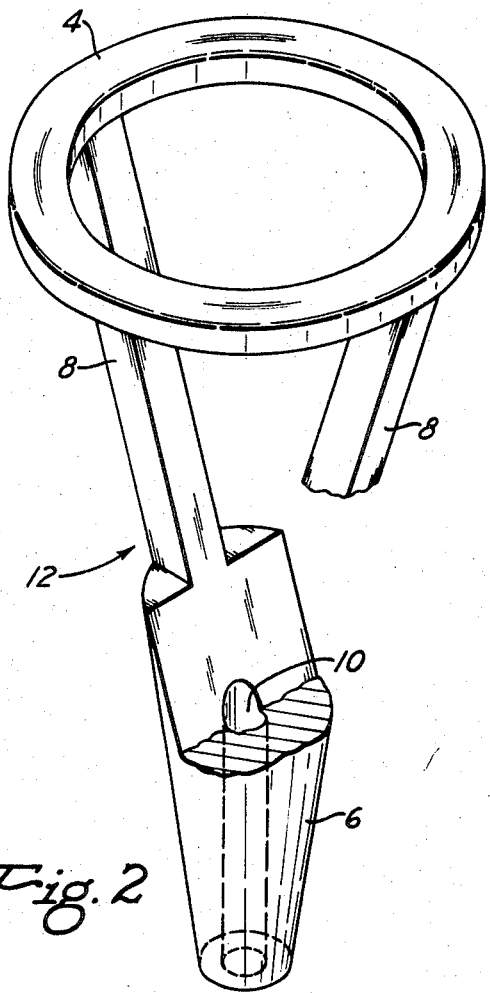
Figure 3:
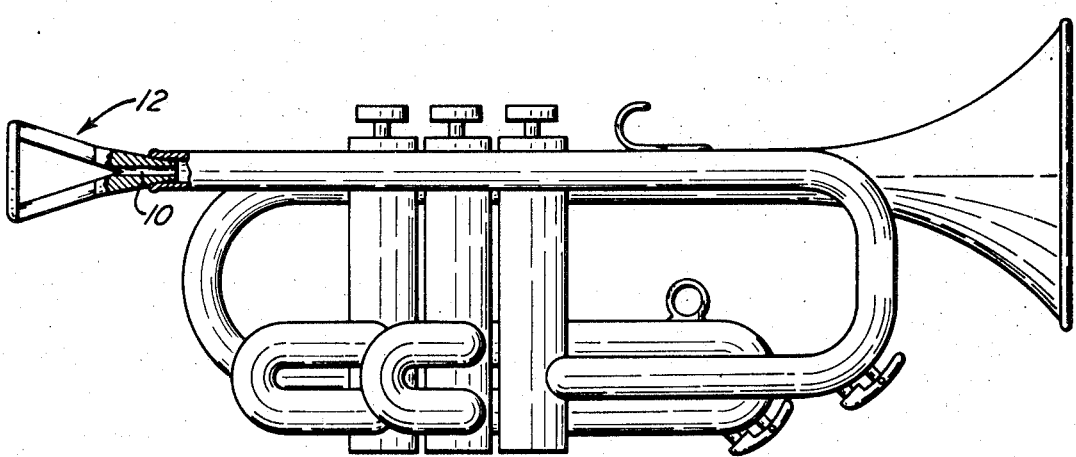

In this connection, reference is made to FIG. 1, which is a view in perspective of the novel teaching aid of the present invention. FIG. 2 is also a view in perspective partly in section, of a preferred embodiment of the novel teaching aid of the present invention. FIG. 3 is an elevational view, partly in section, of the preferred embodiment of FIG. 2 mounted for use in a brass instrument, in this case, a trumpet.

Referring to FIG. 1, the teaching device 2 is composed of a rim 4, preferably circular, a tapered shank 6, tapering away from said rim, and one or more arms 8, each of which is securedly attached at one end to said rim 4 and the other end thereof to the adjacent larger end of said tapered shank 6. The teaching device can be solid or hollow, composed on one piece or of several pieces to make a unitary whole. Brass is preferred, because of its similarity to the material of construction in a normal mouthpiece. However, the teaching device may be constructed of any material, for example, of metals, such as iron, stainless steel, or aluminum, or of plastics, such as nylon, polyethylene, polystyrene, etc., or any combination thereof.

Referring to the preferred embodiment 12 of FIG. 2, the same is designed as in FIG. 1 except that the tapered shank 6 is provided with an opening 10 extending longitudinally therethrough and in substantial alignment with the center point of the geometrical figure encompassed by rim 4. It can be seen from FIG. 2 that arms 8 lie outside an imaginary cone extending from the inside edge of rim 4 to the upper edge of opening 10 in shank 6 and that arms 8 cover only a very small portion of the surface area of the imaginary cone. When the teaching aid is mounted in the mouthpiece of a suitable brass instrument, as will be seen herein in FIG. 3, the opening 10 is also in substantial alignment with the opening in the mouthpipe of the instrument.

In FIG. 3, the teaching device of the preferred embodiment of FIG. 2 is shown snugly mounted in the mouthpipe of a suitable brass instrument, namely, a trumpet, ready for use by the student. The student places the instrument in normal playing position, with his lips centered on the device, and then attempts to play. In the event the teaching device of FIG. 1 is used, however, he cannot play, because the construction of the teaching device does not permit transmission and resulting amplification of vibrations through the instrument. Nevertheless, the student will produce lip vibrations identical to those which occur in the cup of the ordinary mouthpiece of the brass instrument. Thus, any improper placement of the device, or incorrect formations of the lips are exposed and are immediately obvious to the instructor, and/or student. In addition, it enables one to ascertain whether the direction and flow of the air column is correct. Not only will the device be excellent for corrective measures, but it will also enable the instructor to demonstrate the correct embouchure and correct direction of the air flow to a student. The advantage of this device over any other existing device is that it permits the instructor and/or student to observe the student's embouchure under actual playing conditions. Proper development of the student's lips, chin, jaw and cheek muscles can easily be achieved since proper corrective measures can be easily and accurately taken.

When the preferred embodiment of FIG. 2 is employed, however, an additional, and vital, effect is also obtained, despite the absence of a normal mouthpiece cup, through which all vibrations of the air column are usually funnelled. When the vibrating column of air is centered directly through opening 10 into the mouthpipe of the instrument, the instrument will respond, resonantly, to the lip vibrations, thus producing a distinctly audible and characteristic sound. Although the size of the opening 10 is not critical, it should approximate the dimensions in the average mouthpiece normally used in the instrument. Such precise directional control of the air column makes possible transmission of lip vibrations with a minimum expenditure of energy and is essential for the production of the best possible intonation and purest tone.

Obviously, many modifications and variations of the invention, as hereinabove defined, can be made without departing from the scope thereof, and only such limitations should be imposed as are indicated in the appended claims.

I claim:

1. A simulated mouthpiece for a brass musical instrument comprising a circular rim having an inner diameter and an axis, a shank spaced from said rim and externally shaped to mate with said instrument, said shank having a longitudinal bore therethrough coaxial with said axis, said rim and said shank defining an imaginary cone extending from the inner circumference of said rim to the circumference of said bore, and means connecting said shank to said rim, said connecting means lying outside said imaginary cone.

2. A simulated mouthpiece as in claim 1 wherein said connecting means comprises arm means fixed to said rim and said shank, said arm means covering only a small portion of the surface area of said imaginary cone, whereby vibrations directed through the rim toward the bore will be received by the bore, but vibrations directed away from the bore will pass to the exterior of the shank.

3. A simulated mouthpiece as in claim 1 wherein said connecting means is constructed to permit free dissipation of any vibrations coming through said rim and directed outside said bore.

4. A simulated mouthpiece as in claim 1 wherein said connecting means comprises at least one arm fixed to said rim and said shank.

5. A simulated mouthpiece as in claim 4 wherein said arm comprises a thin rod.

6. A teaching aid for brass musical instruments comprising a conventional brass musical instrument without a mouthpiece, and a simulated mouthpiece comprising a circular rim having an inner diameter and an axis, a shank spaced from said rim and externally shaped to mate with said instrument, said shank having a longitudinal bore therethrough coaxial with said axis, said rim and said shank defining an imaginary cone extending from the inner circumference of said rim to the circumference of said bore, and means connecting said shank to said rim, said connecting means lying outside said imaginary cone.

7. A teaching aid as in claim 6 wherein said connecting means comprises arm means fixed to said rim and said shank, said arm means covering only a small portion of the surface area of said imaginary cone, whereby vibrations directed through the rim toward the bore will be received by the bore, but vibrations directed away from the bore will pass to the exterior of the shank.

8. A teaching aid as in claim 6 wherein said connecting means is constructed to permit free dissipation of any vibrations coming through said rim and directed outside said bore.

9. A teaching aid as in claim 6 wherein said connecting means comprises at least one arm fixed to said rim and said shank.

10. A teaching aid as in claim 9 wherein said arm is a thin rod.

* * * * *